United States Patent [19]
Veneruso et al.

[11] Patent Number: 6,138,754
[45] Date of Patent: Oct. 31, 2000

[54] METHOD AND APPARATUS FOR USE WITH SUBMERSIBLE ELECTRICAL EQUIPMENT

[75] Inventors: Anthony F. Veneruso; Gerald W. Robertson, both of Missouri City, Tex.

[73] Assignee: Schlumberger Technology Corporation, Sugar Land, Tex.

[21] Appl. No.: 09/193,962

[22] Filed: Nov. 18, 1998

[51] Int. Cl.[7] .................................................. E21B 47/04
[52] U.S. Cl. ............................ 166/250.03; 166/250.08; 166/66.6; 417/63; 340/870.11; 340/870.16; 324/694
[58] Field of Search .................... 340/870.16, 870.37, 340/870.38, 870.11, 658; 166/66.6, 386, 250.08, 334.1, 250.03; 324/664, 696, 668, 694; 73/49.7, 304 R; 417/63

[56] References Cited

U.S. PATENT DOCUMENTS

| | | | |
|---|---|---|---|
| 1,133,023 | 3/1915 | Hart et al. ................................. | 73/304 |
| 4,064,455 | 12/1977 | Hopkins et al. ........................... | 324/61 |
| 4,312,580 | 1/1982 | Schwomma et al. . | |
| 4,382,382 | 5/1983 | Wang ........................................ | 73/304 |
| 4,586,033 | 4/1986 | Andrejasich ............................. | 430/602 |
| 4,806,847 | 2/1989 | Atherton et al. .......................... | 324/61 |
| 4,971,523 | 11/1990 | Wacker et al. ............................ | 417/63 |
| 5,358,035 | 10/1994 | Grundzinski .............................. | 166/53 |
| 5,447,078 | 9/1995 | Robinson, Jr. et al. . | |
| 5,560,279 | 10/1996 | Connors et al. .............................. | 92/5 |
| 5,975,204 | 11/1999 | Tubel et al. ........................ | 166/250.15 |

OTHER PUBLICATIONS

Electronics, Capacitance Change Indicates Liquid Levels, pp 66–67, Sep. 1960.

Forsheda, *Dowty Rotary Seals*, 1–9, printed from Internet web site http://www.forsheda.co.uk/drs/index.htm and the links contained therein.

Greed Tweed, *Oilfield*, 1–146, printed from Internet web site http://www.gtweed.com/Oilfield/Oil–ProdInfo–TC.htm and the links contained therein.

*Primary Examiner*—Lanna Mai
*Assistant Examiner*—Elaine Gort
*Attorney, Agent, or Firm*—Trop, Pruner & Hu P.C.

[57] ABSTRACT

A system for use in a subterranean well includes a production tubing and a valve. The production tubing has a port to receive well fluid from a formation. The valve is mounted to the production tubing and includes a sealed housing, a motor, a valve cover, an actuator drive and a sensor. The motor is located inside the housing, and the actuator drive is actuated by the motor to move the valve cover over the port to selectively control the communication of the well fluid between the formation and the passageway of the tubing. The sealed housing may permit the well fluid to accumulate inside the housing over time. The sensor is located inside the housing and provides an indication of the amount of well fluid that has accumulated inside the housing. This information may be useful for such exemplary purposes as predicting when the valve will fail and for evaluating the condition of the valve.

45 Claims, 7 Drawing Sheets

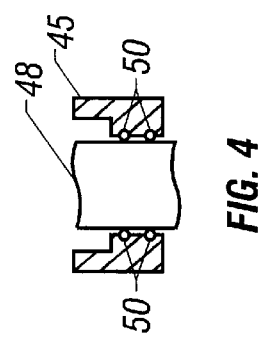
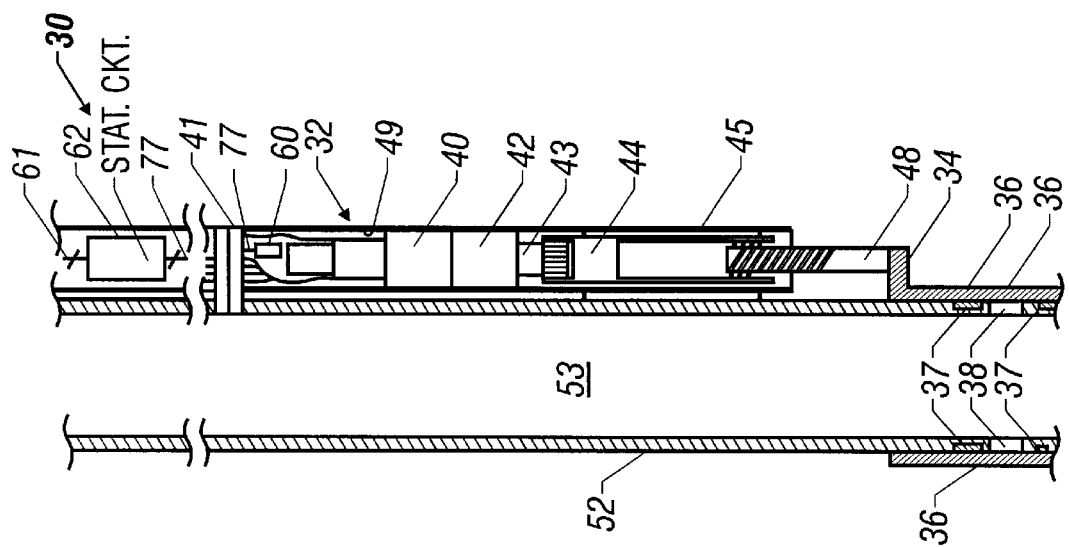
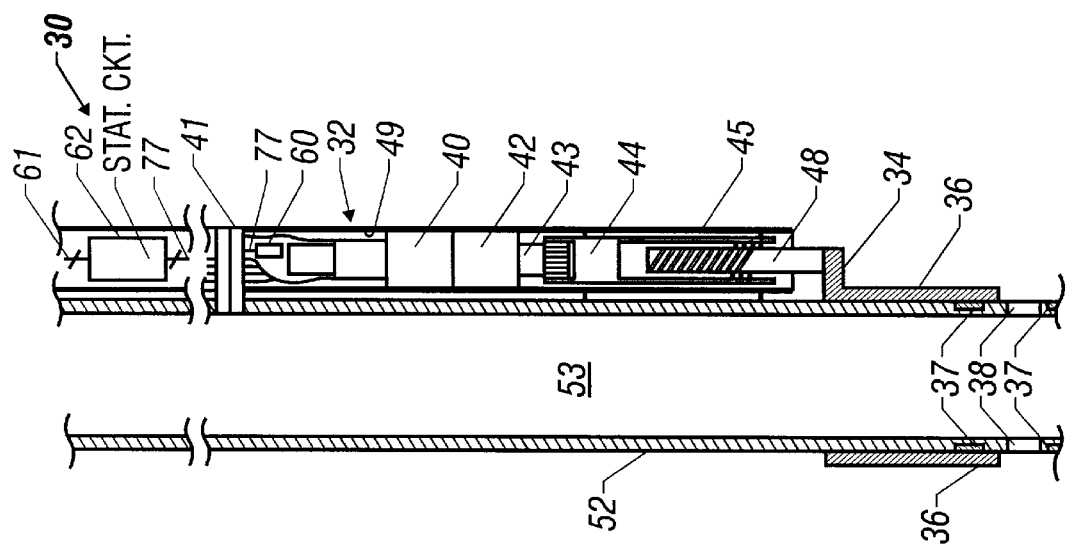

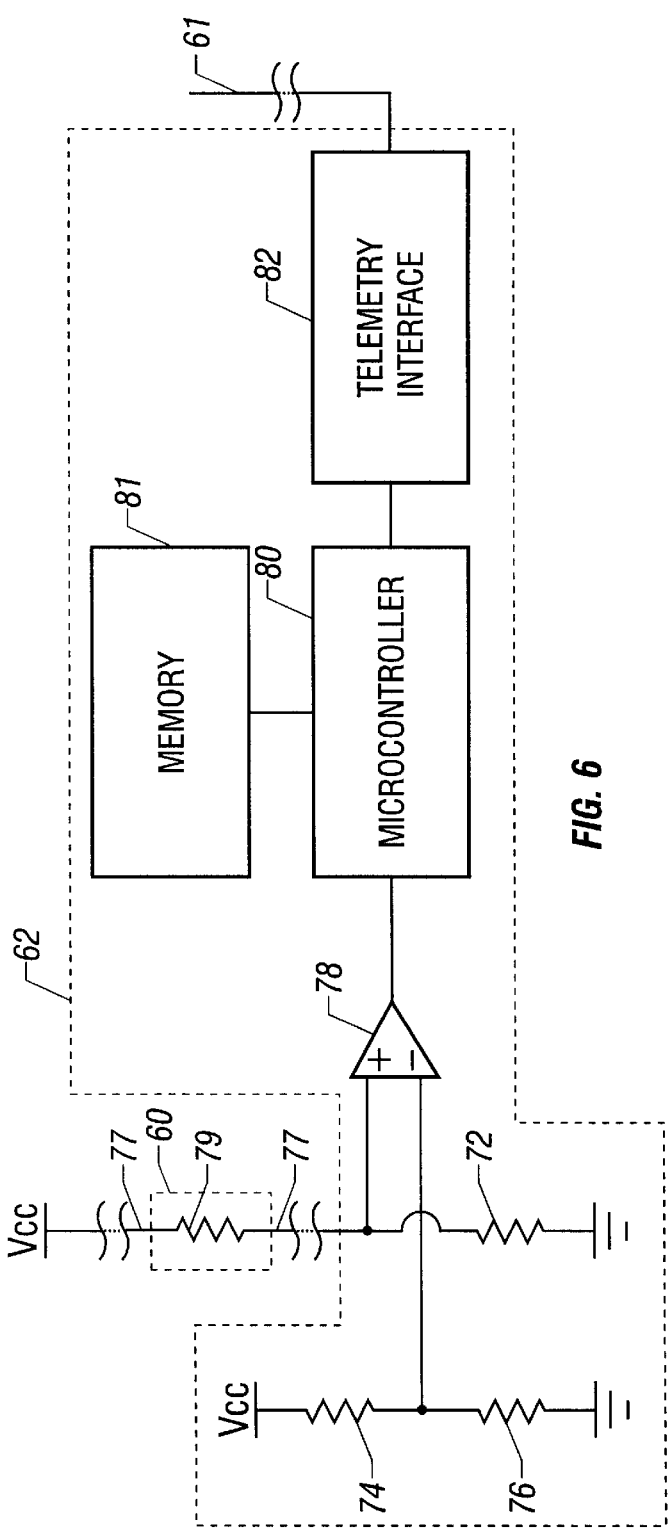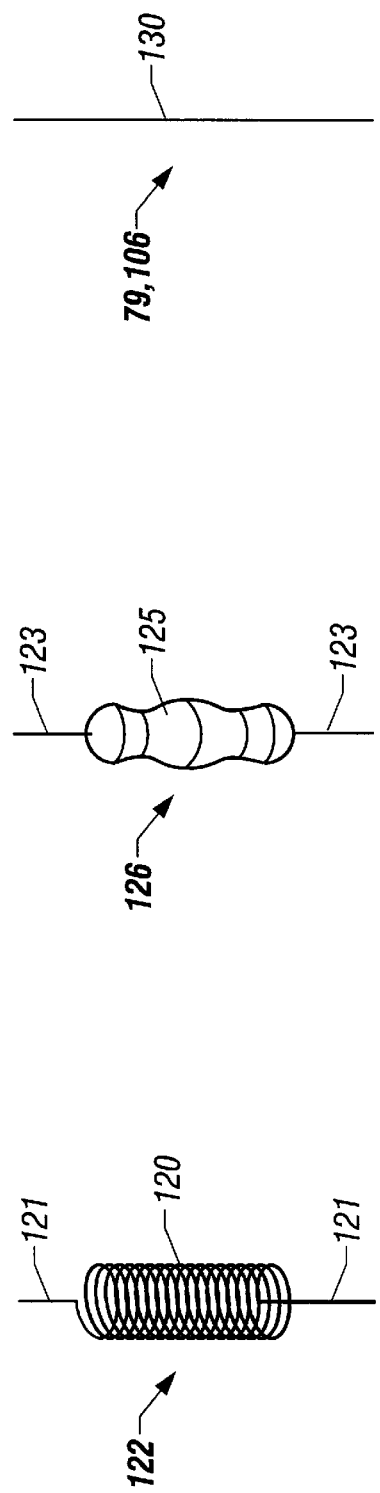

6,138,754

METHOD AND APPARATUS FOR USE WITH SUBMERSIBLE ELECTRICAL EQUIPMENT

BACKGROUND

The invention relates to a method and apparatus for use with submersible electrical equipment.

Electrical equipment, such as an electric motor (a DC motor, for example), may be used in an environment that would otherwise cause the equipment to fail if not for protective measures that are in place to shield the equipment from the environment. For example, referring to FIG. 1, a motor 14 may be part of a valve 10 that controls the flow of well fluid from a producing formation into a production tubing 12. In the operation of the valve 10, the motor 14 actuate a ball screw drive 20 to move a generally cylindrical sleeve 26 (that closely circumscribes the outside of the tubing 12) to either open or close radial ports 8 of the tubing 12 to the flow of well fluid. The valve 10 may be located in an annulus of the well that is filled with well fluid, and unfortunately, the motor 14 may be damaged and may fail if the well fluid contacts the motor 14, as the well fluid may be electrically conductive.

For purposes of isolating the motor 14 from the well fluid, the motor 14 may be located in a chamber 15 of a sealed housing 11 of the valve 10. To further protect the motor 14, the chamber 15 may be filled with a nonconductive, or dielectric, oil.

A potential difficulty with the above-described arrangement is that the seals of the housing 11 may eventually leak and allow the well fluid to gradually flow into the chamber 15 and displace the oil. An operator at the surface of the well may be unaware of this contamination, and as a result, the motor 14 (and thus, the valve 10) may fail without warning. As a result, the operator may unexpectedly loose control of the valve 10 and not be able to plan and take remedial actions (final positioning of the valve, as an example) in anticipation of complete valve failure. Thus, production may be lost due to the unexpected loss of valve control.

Thus, there is a continuing need for a system to monitor and/or predict failure of submersible electrical equipment.

SUMMARY

In one embodiment of the invention, a method is used with electrical equipment that is located in a subterranean well. The electrical equipment is encased by a housing that is at least partially filled by a liquid. The method includes detecting one of multiple levels of well fluid inside the housing based on a difference between a property of the liquid and a property of the well fluid. An indication of the result of the detection is transmitted to a surface of the well.

In another embodiment, an apparatus to be at least partially submerged in a fluid having a first property includes a sealed housing that stores a liquid that has a second property. The apparatus also includes electrical equipment located inside the housing that is at least partially surrounded by the liquid and a sensor that is located inside the housing. The sensor is adapted to indicate an amount of the fluid inside the housing based on a difference between the first and second properties. A status circuit of the apparatus is coupled to the sensor and adapted to indicate different levels of the fluid that is present inside the housing based on the indication from the sensor.

In yet another embodiment, a system for use in a subterranean well includes a production tubing and a valve. The production tubing has a port to establish communication between a passageway of the tubing and well fluid from a formation. The valve is mounted to the production tubing and includes a sealed housing, a motor located inside the housing, a valve cover, an actuator drive and a sensor. The actuator drive is actuated by the motor to selectively move the valve cover over the port to control the communication of the well fluid between the formation and the passageway of the tubing. The sensor is located inside the housing and is adapted to indicate the presence of the fluid inside the housing.

Other embodiments of the invention will become apparent from the following description, from the drawing and from the claims.

BRIEF DESCRIPTION OF THE DRAWING

FIGS. 2 and 3 are cross-sectional views of a production system illustrating operation of a valve according to an embodiment of the invention.

FIGS. 4 is a more detailed view of a portion of the valve of FIGS. 2 and 3 according to different embodiments of the invention.

FIGS. 6 and 8 are schematic diagrams of status circuits for use with resistance sensors according to different embodiments of the invention.

FIGS. 9, 10 and 11 are views of resistive elements of a sensor of the valve according to different embodiments of the invention.

DETAILED DESCRIPTION

Figure 1:
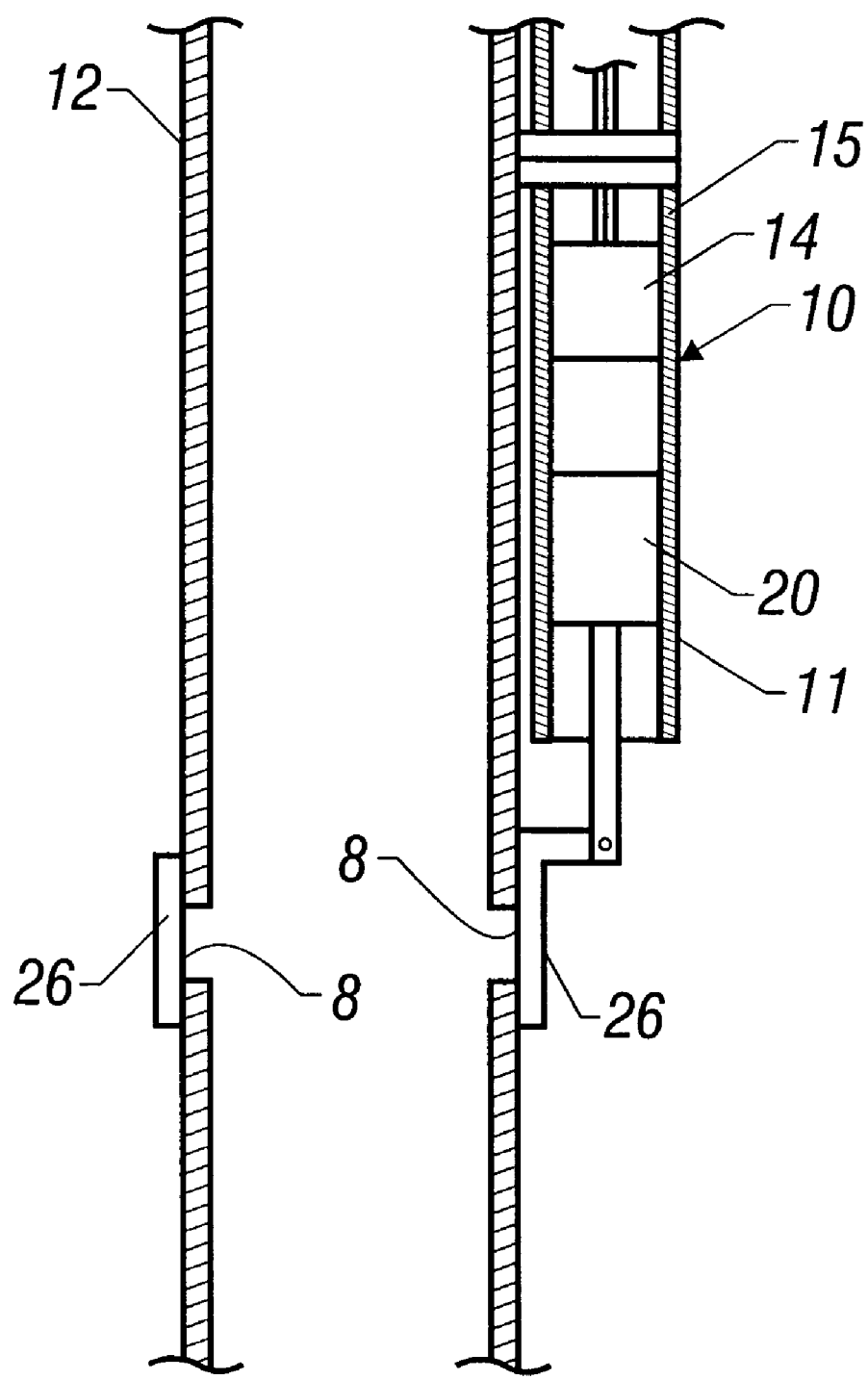
FIG. 1 is a cross-sectional view of a production system of the prior art.

Referring to FIGS. 2 and 3, an embodiment of a production system 30 in accordance with the invention includes a motorized valve formed from a linear actuator 32 and a generally cylindrical valve cover, or sleeve 36. The sleeve 36 is coaxial with and closely circumscribes a production tubing 52 so that the sleeve 36 may control the flow of well fluid into radial ports 38 of the tubing 52. In some embodiments, to move the sleeve 36, the linear actuator 32 has a shaft 48 that is coupled (via an elbow 34) to the sleeve 36. The linear actuator 32 may move the shaft 48 to open (as shown in FIG. 2) the ports 38, close the ports 38 (as shown in FIG. 3) and generally control fluid communication through the ports 38 in a manner to regulate a rate at which well fluid flows into a central passageway 53 of the production tubing 52. Annular gaskets 37 may reside in annular slots on the outside of the production tubing 52 to form seals between the outer surface of the tubing 52 and the sleeve 36. As an example, the term "well fluid" may refer to fluid created by the production of oil or gas (as examples) and may include, but is not limited to, water, oil, gas or a mixture of two or all of these substances.

In some embodiments, the linear actuator 32 may include a motor 40 that is operatively coupled to a gear box 42 to transfer torque to a shaft 43. The shaft 43, in turn, may exert a rotational force to actuate an actuator drive assembly, such as a ball screw drive 44, to move the shaft 48 either in a direction that restricts flow or in a direction that allows more fluid to flow into the radial ports 38. The motor 40, the gear box 42 and the ball screw drive 44 may all be housed inside a generally cylindrical sealed housing 45 that has an interior chamber 49 for holding these components. The housing 45 may be mounted to the outside of the production tubing 52.

The linear actuator 32 may be located in an annulus of a production zone of the well and thus, may be at least partially surrounded by well fluid. To prevent the well fluid from entering the chamber 49 and thus, damaging the motor 40, the linear actuator 32 may include seals. For example, referring to FIG. 4, in some embodiments, the movable actuator shaft 48 may be sealed against the housing 45 via O-rings 50 or other sliding sleeve or shaft seals. As examples, these seals be well known thermoplastic polymers or elastomeric materials that are selected appropriately to endure the expected high temperature and hostile chemical environment. An example of the shaft seals may be found on the Internet at http://www.dowtyseals.co.uk/drs/index.htm or http://www.gtweed.com/OF-ProdInfo-TC.htm.

The O-rings 50, like other seals of the linear actuator 32, have a finite lifetime due to, as examples, chemical reaction aging, mechanical fatigue and/or corrosion. Eventually the seals may leak and allow well fluid to gradually enter the chamber 49. As a result, the well fluid may eventually surround and cause failure of the motor 40.

In some embodiments, for purposes of predicting failure of the motor 40, the linear actuator 32 includes a sensor 60 that is located in the chamber 49 to detect the presence of well fluid. The sensor 60 may accomplish this by comparing a difference in properties (an electrical property, for example) between the well fluid and a fluid (a liquid, for example) that is located in the chamber 45, as described below. In some embodiments, when the sensor 60 indicates the presence of well fluid in the chamber 49, a status circuit 62 responds by generating signals on a communication link, such as a bus 61, to transmit status frames, or packets, to the surface of the well to alert an operator that well fluid is present in the chamber 49. Besides indicating the presence of well fluid, the status packets may also indicate such information as the amount of well fluid in the chamber 49, as described below. As a result of this arrangement, failure of the motor 40 (and valve) may be anticipated.

One or more wires 77 may extend through a bulkhead 41 of the linear actuator 32 to couple the sensor 60 to the status circuit 62 that may, for example, reside in a tool section located uphole of the linear actuator 32. In some embodiments, the bus 61 may operate in accordance with a Modbus protocol that is described in detail on the Internet at www.modicon.com/techpubs/intr7.html.

Figure 5:
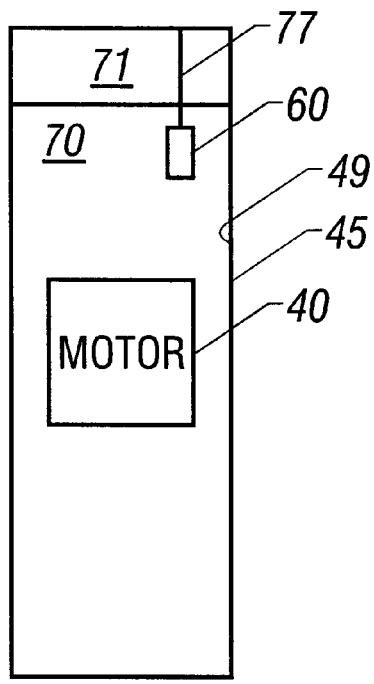
FIGS. 5 and 7 are schematic diagrams of a section of the production valve according to different embodiments of the invention.
Figure 7:
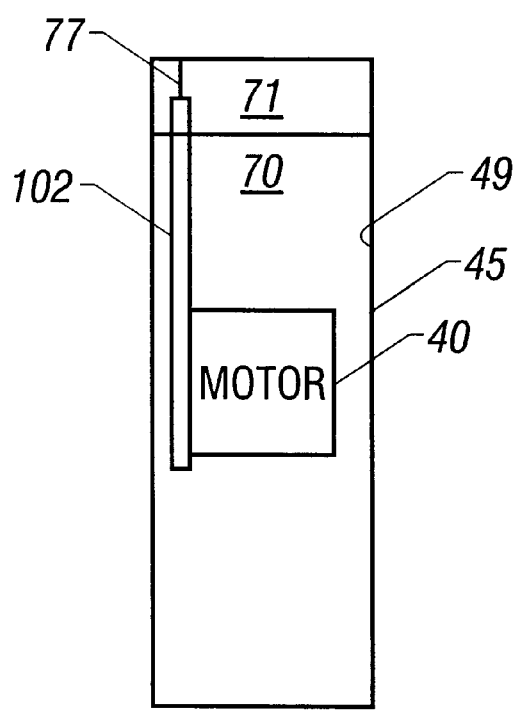

Referring to FIG. 5, in some embodiments, the chamber 49 may be filled with a dielectric liquid, such as an oil 70, that protects the motor 40. However, the oil 70 may be gradually displaced by well fluid (designated by reference numeral "71" in FIGS. 5 and 7) that enters the chamber 49. In some embodiments, the oil 70 is sufficiently dense (an oil having a specific gravity of approximately 1.8, such as a synthetic perfluoronated compound, for example, as compared to the well fluid 71 that has a specific gravity of approximately 1.15, for example) to cause the well fluid 71 to float on top of the oil 70, as depicted in FIG. 5. For these embodiments, the sensor 60 is positioned a predetermined distance below the top of the chamber 49 so that when a predetermined amount of the well fluid 71 enters the chamber 49, the well fluid 71 contacts the sensor 60. In some embodiments, once contact with the well fluid 71 occurs, the sensor 60 indicates this event to the status circuit 62 that may relay an indication of the event to the surface of the well.

Referring to FIG. 6, in some embodiments, the sensor 60 may be a resistance sensor that is formed from a resistive element, such as a resistor 79, to take advantage of the differences in electrical properties between the well fluid 71 and the oil 70. In this manner, the well fluid 71 typically is conductive, as compared to the oil 70 that exhibits, in contrast, dielectric properties. As described below, the resistor 79 has an exposed portion (a terminal or the entire body of the resistor 79, as examples) that is adapted to contact either the oil 70 or the well fluid 71, depending on which is present at the top of the chamber 45. Because, as described below, the resistor 79 is energized, and the housing 45 is coupled to the ground of the status circuit 62, the voltage drop across the resistor 79 may be monitored to detect when the electrically conductive well fluid 71 contacts the resistor 79. In this manner, if the oil 70 surrounds the resistor 79, then the voltage drop across the resistor 79 does not change, as the oil 70 is a dielectric. However, if the well fluid 71 surrounds the resistor 79 (where the resistor 79 is exposed), then the resistor 79 is electrically shunted to ground by the well fluid 71, and as a result, the voltage drop across the resistor 79 decreases to provide an indication that the well fluid 71 is present in the chamber 49.

As an example, in some embodiments, one terminal of the resistor 79 may be coupled (via one of the wires 77, for example) to a positive DC voltage level (called $V_{cc}$), and another terminal of the resistor 79 may be coupled (via one of the wires 77, for example) to the status circuit 62. In some embodiments, the status circuit 62 may include a comparator 78 to detect when the voltage across the resistor 79 decreases to a predetermined low voltage threshold, an event that indicates the resistor 79 is in contact with the well fluid 71. The non-inverting input terminal of the comparator 78 may be coupled to a resistor divider (of the $V_{cc}$ voltage level) that is formed from the resistor 79 (coupled between the $V_{cc}$ voltage level and the non-inverting input terminal) and a resistor 72 (coupled between the non-inverting input terminal and ground) of the status circuit 62. The inverting input terminal of the comparator 78 may be coupled to a resistor divider (of the $V_{cc}$ voltage level) that is formed from a resistor 74 (coupled between the $V_{cc}$ voltage level and the non-inverting input terminal) of the status circuit 62 and a resistor 76 (coupled between the inverting input terminal and ground) of the status circuit 62. In some embodiments, the resistors 72, 74, 76 and 79 have approximately the same resistances.

When the well fluid 71 does not shunt the resistor 79 to ground, the voltage of the inverting input terminal (of the comparator 78) is higher than the non-inverting input terminal, a state that causes the comparator 78 to drive low (drive to ground, for example) an output voltage of the comparator 78. However, when the well fluid 71 shunts the resistor 79 to ground (due to the connection of the ground, the voltage of the non-inverting input terminal becomes greater than the voltage of the inverting input terminal, a state that causes the comparator to 78 to drive high its output voltage to indicate the presence of the well fluid 71. Thus, the comparator 78 and the resistors 72, 74 and 76 may effectively form a one bit, analog-to-digital (A/D) converter.

As an example, in some embodiments, the status circuit 62 may include a microcontroller 80 to monitor the output signal that is provided by the comparator 78. When the comparator 78 drives its output signal high, the microcontroller 80 may respond by interacting with a telemetry interface 82 to transmit (via the bus 61) a status packet to the surface of the well to indicate the presence of the well fluid 71 inside the chamber 49.

Depending on the particular embodiment, the microcontroller 80 may periodically transmit a packet to the surface that indicates whether the well fluid 71 is in the chamber 49, or the microcontroller 80 may transmit the packet only when the well fluid 71 is detected. Other arrangements are possible. The status circuit 62 may include a memory 81 to store instructions to cause the microcontroller 80 to behave as described above.

Figure 8:
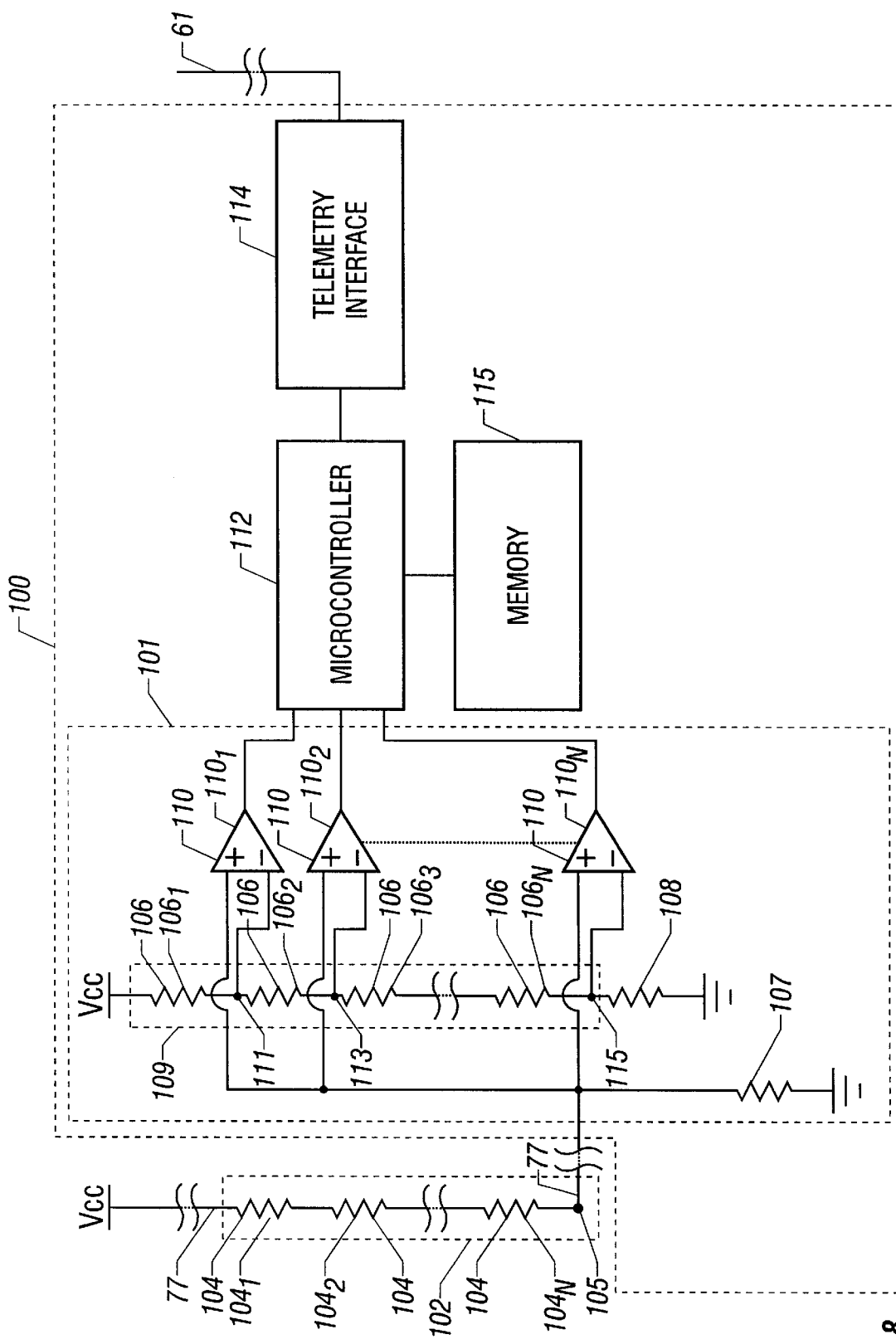

Referring to FIG. 8, in some embodiments, the sensor 60 may be replaced by another resistance sensor 102 that is adapted to indicate an amount of the well fluid 71 that is present in the chamber 49. As a result of this arrangement, the lifetime of the motor 40 may be more accurately predicted. As an example, the sensor 102 may indicate a degree of contamination inside the chamber 49, such as indicating 0, ½, ⅔ and ¾ contamination.

In some embodiments, the sensor 102 may include N resistive elements, such as resistors 104 (resistors $104_1$, $104_2$, . . . $104_N$, as examples) that are serially coupled together to form a resistor chain that substantially extends along the longitudinal length (i.e., the dimension aligned with the gravitational field) of the sensor 102. In some embodiments, the resistors chain or another set of resistive elements (N resistive elements, for example) may be aligned around the circumference of the interior of the housing 45 to indicate the amount of well fluid in those instances where the valve 30 and linear actuator 32 are installed in an inclined or horizontal well. One end of the resistor chain may be coupled to the $V_{cc}$ voltage level, and the other end of the resistor chain is coupled to a node 105 that provides an indication of the amount of well fluid 71 present in the chamber 49. A resistor 107 may be coupled between the node 105 and ground.

As the well fluid enters the chamber 49, the resistors 104 are shunted by the well fluid 71 one at a time. As an example, the well fluid 71 may shunt the resistor $104_1$ first, the resistor $104_2$ second, etc. The shunting of each resistor 104, in turn, contributes to a change in the voltage of the node 105. In this manner, as more well fluid 71 enters the chamber 49, the voltage drop across the string resistors 104 gradually decreases, an event which causes the voltage on the node 105 to rise.

For embodiments that use the sensor 102, a status circuit 100 (that replaces the status circuit 62) may be coupled to the node 105 (via one of the lines 77, for example) to monitor the voltage level of the node 105 and furnish signals to the bus 61 to transmit status packets to the surface of the well. In some embodiments, the status circuit 100 may include an A/D converter 101 that may include N comparators 110 (comparators $110_1$, $110_2$, . . . $110_N$, as examples), each of which indicates when the amount of well fluid 71 in the chamber 49 reaches a different predetermined level. As examples, the comparator $110_N$ may drive high its output signal when the well fluid 71 shunts the resistor $104_1$ to indicate one quarter contamination of the housing 45, and the comparator $110_1$ may drive high its output signal when the well fluid 71 shunts the resistor $104_N$ to indicate full contamination. The non-inverting input terminals of the comparators 110 are coupled to the node 105.

As an example, the A/D converter 101 may include a resistor chain 109 that serves as a voltage divider (of the $V_{cc}$ voltage level) to provide reference voltage levels that are received by the inverting input terminals of the comparators 110. In some embodiments, the resistor chain 109 may include N serially coupled resistors 106 (resistors $106_1$, $106_2$, . . . $106_N$, as examples). In some embodiments, the resistors 104 (of the sensor 102) and 106 (of the status circuit 100) have approximately the same resistance values. The inverting input terminal of each comparator $110_1$, $110_2$, . . . $110_{N-1}$ is coupled to a different node where two of the resistors 106 are serially coupled together. As examples, the inverting input terminal of the comparator $110_1$ is coupled to a node 111 where the resistors $106_1$ and $106_2$ are serially coupled together, and the inverting input terminal of the comparator $110_2$ is coupled to a node 113 where the resistors $106_2$ and $106_3$ are coupled together. The inverting input terminal of the comparator $110_N$ may be coupled to a node 115 where the resistor $106_N$ is serially coupled to one terminal of a resistor 108. The other terminal of the resistor 108 is coupled to ground. In some embodiments, the resistors 107 and 108 may have approximately the same resistances.

Thus, the comparators 110 collectively indicate an N bit digital signal that indicates the voltage level of the node 105. The A/D converter 101 is an exemplary circuit that may be replaced by one of many different types of A/D converters or other voltage level detection circuits, as can be appreciated by those skilled in the art. In some embodiments, the digital signal that is provided by the A/D converter 101 may be received by a microcontroller 112 that may interact with a telemetry interface 114 to generate signals on the bus 61 to transmit status packets (that indicate the amount of well fluid 71) to the surface of the well. The status circuit 100 may include a memory 115 to store instructions to cause the microcontroller 112 to behave as described above.

The resistors (the resistor 79 or 104, as examples) of the sensor may be formed from many different types of resistors. For example, the resistor may be a wirewound resistor 122 (see FIG. 9) that includes an electrically exposed body 120 and electrically exposed terminals 121. Thus, the well fluid 71 may shunt the resistor 122 along the entire length of the resistor 122. The resistor may be, as another example, a carbon or metal film resistor 126 (see FIG. 10) that includes an insulated body 125 and exposed conductive terminals 123. Thus, the well fluid 71 does not shunt the resistor 126 until the well fluid contacts both terminals 123. As another example, the resistor may be a piece of exposed wire 130 (see FIG. 11), and as a result, the sensor 60, 102 may be formed partially or in whole out of a single wire. The resistors of a particular sensor may include several different types of resistors. Thus, for example, one resistor may be a wire, and another resistor may be a carbon film resistor.

Other embodiments are within the scope of the following claims. For example, the sensor may be used to detect the presence of fluid other than well fluid. As another example, the sensor may be used in a valve that is used to control the flow of well fluid in a lateral well. Electrical equipment other than a motor may be located inside a housing, and thus, the failure of this electrical equipment may also be predicted using the above-described techniques and circuitry.

Figure 12:
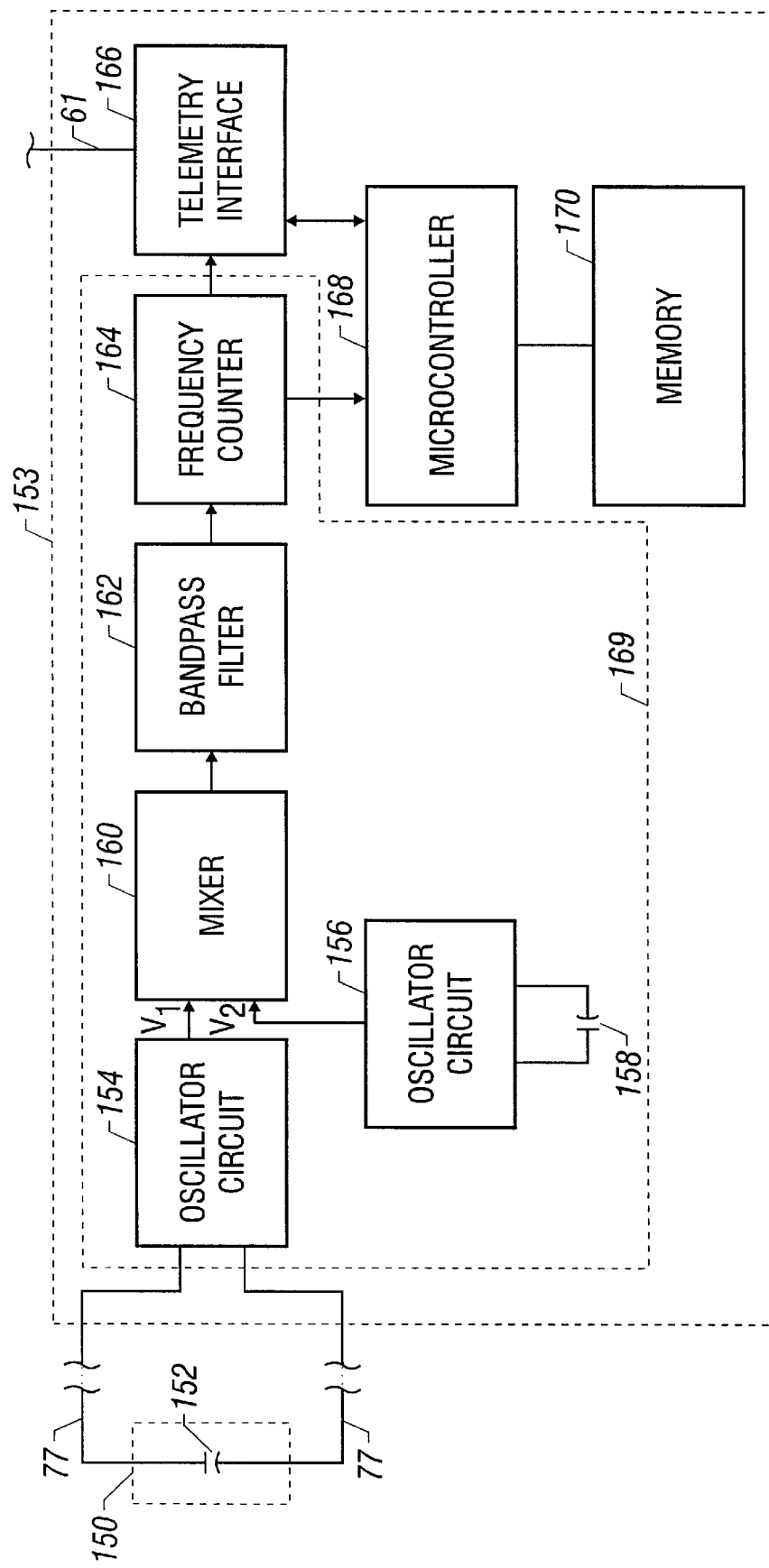
FIG. 12 is a schematic diagram of a status circuit for use with a capacitance sensor according to an embodiment of the invention.

As yet another example, other types of sensors, other than a resistance sensor, may be used. For example, referring to FIG. 12, in some embodiments, a capacitance sensor 150 may be used in place of or in addition to one or more of the resistance sensors described above. The operative principle for this type of sensor is based on the significant contrast in capacitance between water that has a relatively high dielectric constant (the dielectric constant for water may vary from 80 at room temperature down to 55.5 at 100° C., as an example) and a dielectric oil that has a relatively low dielectric constant (the dielectric constant for the dielectric oil may vary from 1 to 2, as an example, depending on the specific fluid selected and the temperature). A key advantage of the capacitance sensor is that the sensor can detect isolated water droplets in the oil as compared to a resistance sensor that may require a significant amount of water to create a continuous electric circuit from the terminals, for example, of a resistive element through the water.

In some embodiments, the capacitance sensor 150 may include a capacitor 152 (described below) that is coupled (via the lines 77, for example) to a status circuit 153 that may communicate uphole via the bus 61. The status circuit 153 may include a capacitance detection circuit 169. As an example, in some embodiments, the capacitance detection circuit 169 may include an oscillator circuit 154 that is coupled to the capacitor 152 to produce a sinusoidal output voltage (called $V_1$) that has a frequency (called $f_1$) that is a function of the capacitance of the capacitor 152. As an example, the $f_1$ frequency may be proportional to $$\sqrt{\frac{1}{C}},$$

where "C" represents the capacitance of the capacitor 152.

As the amount of water increases inside the chamber 49, the higher dielectric constant provided by the water increases the capacitance of the capacitor 152 and thus, decreases the $f_1$ frequency, an event that is detected by the status circuit 153, as described below.

Figure 13:
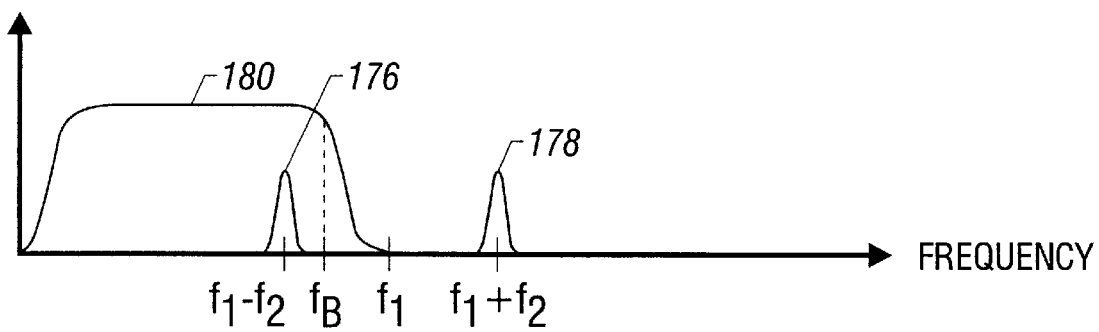
FIG. 13 is a spectral energy versus frequency plot illustrating operation of the status circuit of FIG. 12.

In particular, in some embodiments, the $V_1$ voltage is received by a mixer 160 that modulates the $V_1$ voltage with a reference sinusoidal voltage (called $V_2$ and having a frequency $f_2$) to produce a modulated output voltage that has a lower frequency spectral component 176 (see also FIG. 13) located near a $f_1-f_2$ frequency and a higher frequency spectral component 178 located near a $f_1+f_2$ frequency. As an example, in some embodiments, a bandpass filter 162 (see FIG. 12) may have a frequency response 180 that is designed with an upper 3 db cutoff frequency (called $f_B$) to filter out the higher frequency spectral component 178 and allow the lower frequency component 176 to pass through the filter 162. As a result of this arrangement, the $f_1-f_2$ frequency may be detected and indicated by a frequency counter 164. The microcontroller 168 may use the frequency indicated by the frequency counter 164 to determine the capacitance of the capacitor 156 and thus, determine the amount of well fluid (water, for example) that is present in the chamber 49.

In other embodiments, the bandpass filter 162 may have a frequency response that is designed with a lower 3 db cutoff frequency to filter out the lower spectral component 176 and allow the higher frequency component 178 to pass through the filter 162. For these embodiments, the $f_1+f_2$ frequency is detected by the frequency counter 164 and used by the microcontroller 168 to determine the amount of well fluid present in the chamber 49.

The status circuit 153 may also include a memory 170 that stores instructions for the microcontroller 168 and a telemetry interface 166 that the microcontroller 168 may use to communicate (via the bus 61, for example) with circuitry at the surface of the well. A reference oscillator circuit 156 of the status circuit 153 may furnish the sinusoidal $V_2$ voltage, and the reference oscillator circuit 156 may be coupled to a reference capacitor 158 that establishes the $f_2$ frequency.

Figure 14:
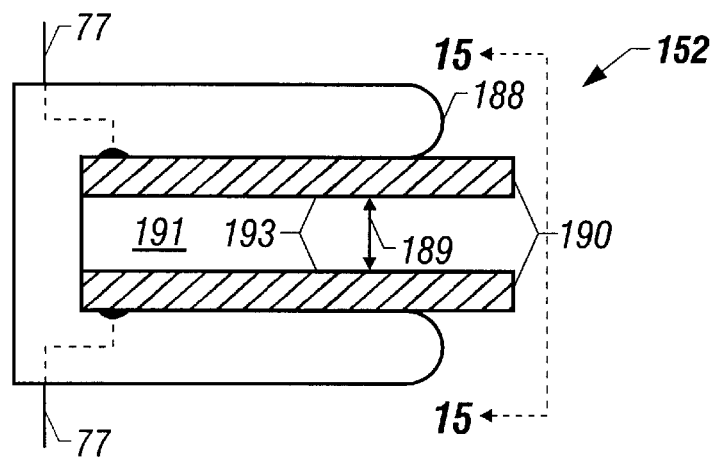
FIGS. 14 is a side view of a capacitance sensor according to an embodiment of the invention.
Figure 15:
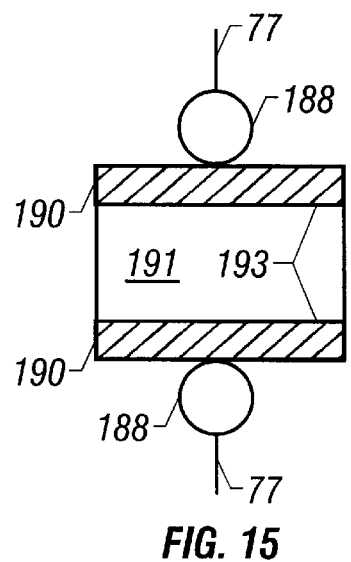
FIG. 15 is a cross-sectional view of the capacitance sensor taken along line 15—15 of FIG. 14.

Referring to FIGS. 14 and 15, in some embodiments, the capacitor 152 may include substantially flat and substantially parallel electrodes 190 that have electrically exposed surfaces 193 that face each other. An open region 191 between the exposed surfaces 193 allows well fluid and/or the dielectric oil to flow in between the surfaces 193 and alter the capacitance of the capacitor 152. In this manner, the electrodes 190 may be separated by a predetermined distance 189 to create a maximum initial $f_1$ frequency when only the dielectric oil is present, and as the well fluid (water, for example) displaces the oil, the capacitance of the capacitor 152 decreases along with the $f_1$ frequency. The electrodes 190 may be held in place by a electrically non-conductive U-shaped body 188, as an example. A different one of the wires 77 may be connected to each electrode 190 to couple the electrodes 190 to the status circuit 153.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. An apparatus to be at least partially submerged in a fluid having a first property, the apparatus comprising:
   a sealed housing storing a liquid having a second property;
   electrical equipment located inside the housing and at least partially surrounded by the liquid;
   a sensor located inside the housing and adapted to indicate an amount of the fluid inside the housing based on a difference between the first and second properties; and
   a status circuit coupled to the sensor and adapted to indicate different nonzero levels of the fluid inside the housing based on the indication by the sensor.

2. The apparatus of claim 1, wherein the sealed housing is further adapted to be placed in a subterranean well.

3. The apparatus of claim 1, wherein the electrical equipment comprises a motor.

4. The apparatus of claim 1, wherein the sensor comprises at least one resistor.

5. The apparatus of claim 4, wherein at least one of said at least one resistor comprises:
   an insulated portion including a resistive element; and
   a non-insulated terminal coupled to the resistive element.

6. The apparatus of claim 4, wherein at least one of said at least one resistor comprises:
   a wirewound resistor.

7. The apparatus of claim 1, wherein at least one of said at least one resistor comprises:
   a wire.

8. The apparatus of claim 1, further comprising:
   a communication link,
   wherein the status circuit comprises:
      a telemetry interface adapted to generate signals on the communication link indicative of the indication from the sensor.

9. The apparatus of claim 8, wherein a communication link extends to the surface of the well.

10. The apparatus of claim 8, wherein the status circuit comprises:
    a resistance detection circuit adapted to indicate a resistance of the sensor based on the indication from the sensor.

11. The apparatus of claim 10, wherein the resistance detection circuit comprises:
an analog-to-digital converter to convert the indication from the sensor into a digital indication.

12. The apparatus of claim 8, wherein the status circuit comprises:
a capacitance detection circuit adapted to indicate a capacitance of the sensor based on the indication from the sensor.

13. The apparatus of claim 12, wherein the capacitance detection circuit comprises:
a first oscillator adapted to generate a first signal based on the capacitance of the sensor;
a second oscillator adapted to generate a second signal having a reference frequency;
a mixer adapted to modulate the first signal with the second signal to produce an output signal; and
a frequency counter adapted to indicate the capacitance based on the output signal.

14. The apparatus of claim 1, wherein the sensor comprises a resistance sensor.

15. The apparatus of claim 1, wherein the sensor comprises a capacitance sensor.

16. The apparatus of claim 1, wherein the fluid comprises a well fluid and the liquid comprises an oil.

17. A system for use in a subterranean well, comprising:
a production tubing having a port to establish communication between a passageway of the tubing and well fluid from a formation; and
a valve mounted to the production tubing, the valve comprising:
a sealed housing;
a motor located inside the housing;
a valve cover;
an actuator drive connected to the valve cover actuated by the motor to move the valve cover over the port to selectively control the communication of the well fluid between the formation and the passageway of the tubing;
a sensor located inside the housing and adapted to indicate different nonzero levels of the fluid inside the housing; and
a status circuit coupled to the sensor and adapted to indicate different nonzero levels of the fluid inside the housing based on the indication by the sensor.

18. The system of claim 17, further comprising:
a status circuit coupled to the sensor and adapted to indicate different levels of the fluid present inside the housing.

19. The system of claim 17, wherein the sensor comprises at least one resistor.

20. The system of claim 19, wherein at least one of said at least one resistor comprises:
an insulated portion including a resistive element; and
a non-insulated terminal coupled to the resistive element.

21. The system of claim 19, wherein at least one of said at least one resistors comprises a wire.

22. The system of claim 19, wherein at least one of said at least one resistor comprises:
a wirewound resistor.

23. The system of claim 17, further comprising:
a communication link extending to the surface of the well;
a status circuit coupled to the sensor and adapted to indicate different levels of the fluid present inside the housing; and a telemetry interface coupled to receive the indication from the status circuit and adapted to generate signals on the communication link indicative of the indication from the sensor.

24. The system of claim 17, further comprising:
another fluid located inside the housing, said another fluid exhibiting substantially different dielectric properties.

25. The system of claim 18, wherein the sensor comprises at least one capacitor.

26. The system of claim 25, wherein at least one of said at least one capacitor comprises:
an electrically non-conductive body; and
electrodes mounted to the body, the electrodes having electrically exposed and opposing surfaces; and
detecting the presence of well fluid inside the housing that encases the electrical equipment based on a difference between a property of the first fluid and a property of the well fluid.

27. A method for use with electrical equipment located in a subterranean well, the electrical equipment encased by a housing being at least partially filled with a liquid having a first property, comprising:
detecting one of multiple nonzero levels of well fluid inside a housing that encases the equipment based on a difference between the first property and a property of the well fluid; and
transmitting an indication of the result of the detection to a surface of the well.

28. The method of claim 27, wherein the act of detecting comprises:
measuring a resistance inside the housing.

29. The method of claim 27, wherein the act of detecting comprises:
measuring a capacitance inside the housing.

30. The method of claim 27, wherein the electrical equipment comprises:
a motor.

31. An apparatus to be at least partially submerged in a fluid having a first property, the apparatus comprising:
a sealed housing storing a liquid having a second property;
electrical equipment located inside the housing and at least partially surrounded by the liquid, the electrical equipment comprising a motor;
a valve cover;
an actuator drive connected to the valve cover actuated by the motor to move the valve cover;
a sensor located inside the housing and adapted to indicate an amount of the fluid inside the housing based on a difference between the first and second properties; and
a status circuit coupled to the sensor and adapted to indicate different levels of the fluid inside the housing based on the indication by the sensor.

32. The apparatus of claim 31, wherein the sealed housing is further adapted to be placed in a subterranean well.

33. The apparatus of claim 31, wherein the sensor comprises at least one resistor.

34. The apparatus of claim 33, wherein at least one of said at least one resistor comprises:
an insulated portion including a resistive element; and
a non-insulated terminal coupled to the resistive element.

35. The apparatus of claim 33, wherein at least one of said at least one resistor comprises:
a wirewound resistor.

36. The apparatus of claim 31, wherein at least one of said at least one resistor comprises:

a wire.

37. The apparatus of claim 31, further comprising:

a communication link, wherein the status circuit comprises:

a telemetry interface adapted to generate signals on the communication link indicative of the indication from the sensor.

38. The apparatus of claim 37, wherein the communication link extends to a surface of a well.

39. The apparatus of claim 37, wherein the status circuit comprises:

a resistance detection circuit adapted to indicate a resistance of the sensor based on the indication from the sensor.

40. The apparatus of claim 39, wherein the resistance detection circuit comprises:

an analog-to-digital converter to convert the indication from the sensor into a digital indication.

41. The apparatus of claim 37, wherein the status circuit comprises:

a capacitance detection circuit adapted to indicate a capacitance of the sensor based on the indication from the sensor.

42. The apparatus of claim 41, wherein the capacitance detection circuit comprises:

a first oscillator adapted to generate a first signal based on the capacitance of the sensor;

a second oscillator adapted to generate a second signal having a reference frequency;

a mixer adapted to modulate the first signal with the second signal to produce an output signal; and a frequency counter adapted to indicate the capacitance based on the output signal.

43. The apparatus of claim 31, wherein the sensor comprises a resistance sensor.

44. The apparatus of claim 31, wherein the sensor comprises a capacitance sensor.

45. The apparatus of claim 31, wherein the fluid comprises a well fluid and the liquid comprises an oil.

* * * * *